United States Patent [19]
Renz et al.

[11] Patent Number: 5,687,958
[45] Date of Patent: Nov. 18, 1997

[54] METALLIC DAMPING BODY

[75] Inventors: Rainer Renz, Stuttgart; Johann Krämer, Leonberg, both of Germany

[73] Assignee: Mercedes-Benz AG, Germany

[21] Appl. No.: 936,296

[22] Filed: Aug. 28, 1992

[30] Foreign Application Priority Data

Aug. 28, 1991 [DE] Germany .................. 41 28 465.8

[51] Int. Cl.$^6$ .................. F16M 1/00; C22C 43/00
[52] U.S. Cl. .................. 267/136; 267/182; 298/638; 148/402
[58] Field of Search .................. 428/909, 960; 188/378, 379; 248/638; 267/136, 137, 162, 182; 52/167 R; 148/402

[56] References Cited

U.S. PATENT DOCUMENTS

| | | | |
|---|---|---|---|
| 3,075,619 | 1/1963 | McCaudliss | 267/136 |
| 3,174,740 | 3/1965 | Hawkins | 267/136 |
| 3,462,136 | 8/1969 | Ramsey | 188/379 |
| 4,335,557 | 6/1982 | Morton | 52/167 R |
| 4,340,210 | 7/1982 | Townsend | 267/137 |
| 4,433,582 | 2/1984 | Joosten | 148/402 |
| 4,566,231 | 1/1986 | Konsevich | 52/167 R |
| 4,731,966 | 3/1988 | Fujita et al. | 52/167 R |
| 4,897,006 | 1/1990 | Bliu | 411/368 |
| 4,901,573 | 2/1990 | Srinivasan et al. | 248/550 |
| 5,072,917 | 12/1991 | Pleua | 267/162 |

FOREIGN PATENT DOCUMENTS

| | | |
|---|---|---|
| 53 093 107 | 8/1978 | Japan . |
| 58 034 103 | 2/1983 | Japan . |
| 59 184 775 | 10/1984 | Japan . |
| 1061200 | 12/1963 | United Kingdom . |
| 1109969 | 4/1968 | United Kingdom . |
| 1151410 | 5/1969 | United Kingdom . |
| 1176791 | 1/1970 | United Kingdom . |
| 1284396 | 8/1972 | United Kingdom . |

OTHER PUBLICATIONS

*Engineering Materials and Their Applications*, 3rd ed., Richard A. Flinn and Paul K. Trojan, Haughton Mifflin Company, Boston Massachusetts, 1986 pp. 78–80 and 217, 219, 221.

Dämpfungsvermögen von Formgedähtnis–Legierungen, Dr. P. Tautzenberger, Pforzham, Carl Hanser Verlag, Munchën 1989, pp. 215–217.

Modeling of a Shape Memory Integrated Actuator For Vibration Control of Large Space Structures, B.J. Maclean, G. J. Patterson, and M. S. Misra, Martin Marietta Space Systems, Denver, CO pp. 72–94, J. of Intell. Mater. Syst. and Struct., vol. 2, Jan. 1991.

Primary Examiner—Robert J. Oberleitner
Assistant Examiner—Chris Schwartz
Attorney, Agent, or Firm—Evenson, McKeown, Edwards & Lenahan, P.L.L.C.

[57] ABSTRACT

A damping body for damping periodically alternating loads uses a shape-memory alloy material to govern the damping. The damping body is sintered from metal grains or is laminated from a plurality of perforated sheet-metal layers. The individual sheet-metal layers are orientated transversely or parallel to the loading direction and are connected to one another over the full surface area. A combination formed from a multiplicity of round pins orientated parallel to the loading direction and having enclosed gussets can also be used as a damping body. A certain hollow-space portion inside the damping body can also be created by drilling, slitting or grooving. The proportion of the open pore or bore volume of the damping body to the total volume is at least 5%, preferably about 15 to 40%. On account of the hollow spaces integrated in the damping body, multiaxial stress states impairing the damping behavior can be effectively avoided or at any rate reduced even in an unfavorably flat or wide configuration of the damping body.

8 Claims, 3 Drawing Sheets

METALLIC DAMPING BODY

BACKGROUND AND SUMMARY OF THE INVENTION

The present invention relates to a metallic damping body for damping periodically alternating loads and, more particularly, to a damping body being made from shape-memory alloy material.

Journal ZfW 84 (1989) 4, pages 215 to 217, Tautzenberger, "Dämpfungsvermögen von Formgedächtnis-Legierungen" refers to the comparatively high damping power of shape-memory alloys, in particular in the martensitic structural state, compared with other metals. The damping power is, however, not uniformly high, but changes as a function of various influencing variables. The stated factors relevant to the damping level of such shape-memory alloys are the structural state, namely martensitic or austenitic; operating temperature, in particular the damping is at an optimum level around the martensite starting temperature; the magnitude of cyclic expansion, i.e. during high cyclic expansions, the martensitic structure has a very effective damping action over a wide temperature range; the static basic load; and the mechanical and thermal pretreatment, as well as the ageing state.

In connection with static pretensioning of a damping body of shape-memory alloy and its effect on the damping behavior, preferred martensite variants are produced by applying static pretension to reduce the size of the highly mobile boundary surfaces in the material. This, however, has been observed to result in a reduction in the damping. It is not possible to realize the high damping values when the damping body is configured in the form of bearing shells or other flat damping bases.

An object of the present invention is to improve the aforementioned metallic damping body, of shape-memory alloy such that a high damping effect is obtained even in a flat and/or wide configuration of the damping body.

This object has been achieved according to the present invention by arranging in the interior of the damping body a multiplicity of closely adjacent, small and uniformly distributed hollow spaces collectively constituting at least 5% of the total volume of the damping body.

The provision of a porous damping body or a damping body having hollow spaces is based on the recognition that the observed reduction in damping during compressive loading of a solid damping body is at least also caused by the occurrence of multiaxial stress states on account of impaired transverse expansion inside the damping body. These stress states reduce internal boundary-surface friction and, thus, also reduce a damping-action. The occurrence of multiaxial stress states is prevented by the proposed porosity or the hollow-space distribution in the interior of the damping body so that the mutual mobility of the internal boundary surfaces is not disturbed and these boundary surfaces can advantageously rub against one another.

BRIEF DESCRIPTION OF THE DRAWINGS

These and further objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
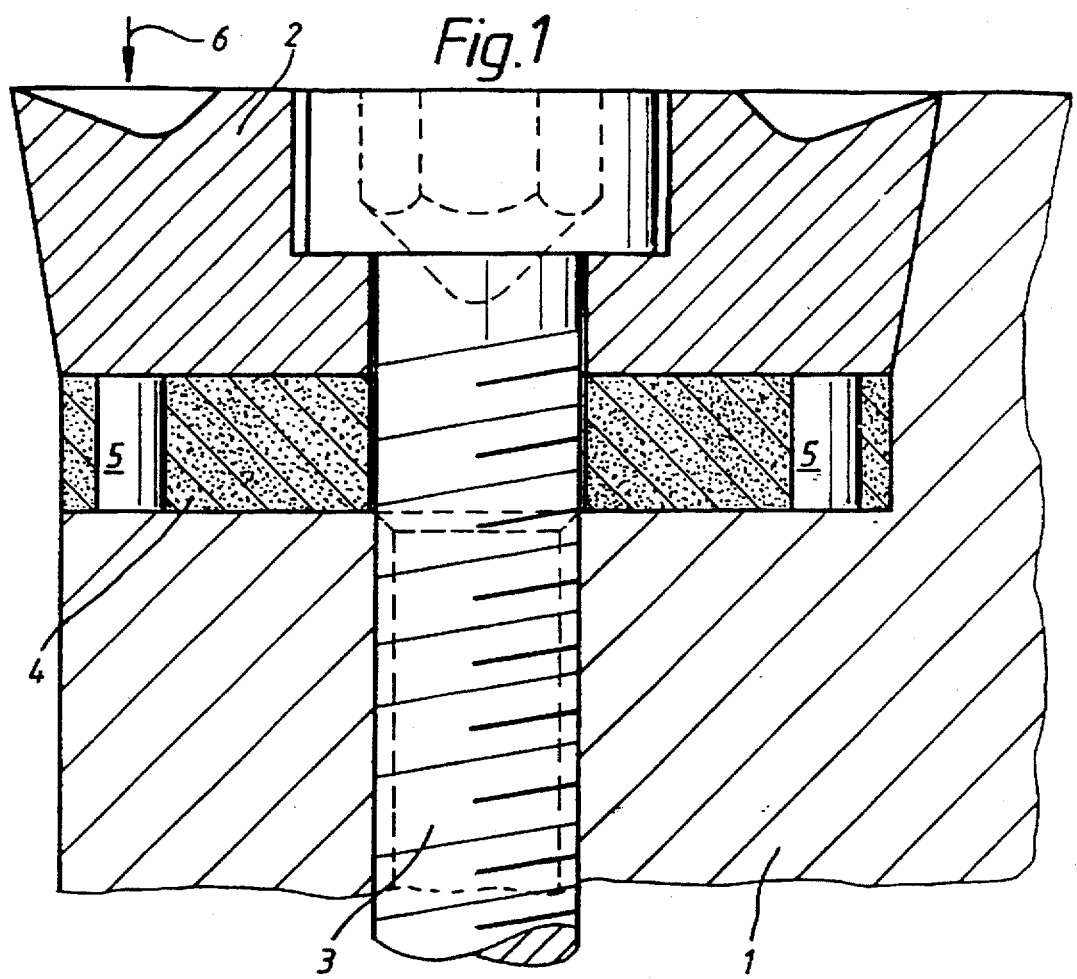
FIG. 1 is a cross-sectional view through a damping body sintered from shape-memory alloy and having an integrated relieving body in an embodiment of a damping base for an indexable insert.
Figure 2:
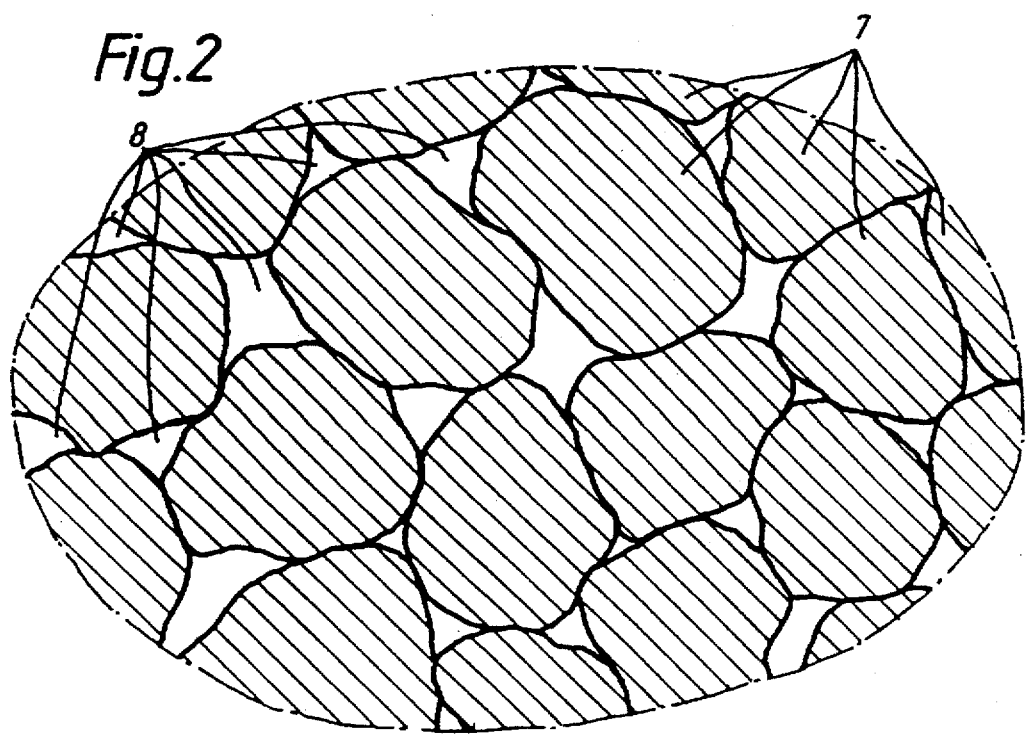
FIG. 2 is a greatly enlarged detail of the sintered structure of the damping body of FIG. 1.

In FIGS. 1 and 2, the damping body made of shape-memory alloy is used as a damping base 4 for an indexable insert 2 firmly clamped in a turning tool 1 by clamping screw 3. In order to avoid the multiaxial stress states which normally occur during high loading and which hinder unimpeded sliding or rubbing along the boundary surfaces, the damping base 4 of metal grains 7 of shape-memory alloy is sintered together to form a porous combination with a multiplicity of closely adjacent, small and uniformly distributed pores 8 arranged in the interior of the damping body 4. The pores 8 together make up at least about 5% of the total volume of the damping body 4 and preferably about 15 to 40% of the total volume. On account of the pores or the other hollow spaces in the other embodiments of damping bodies, each of the supporting material particles can expand or contract transversely to the loading direction indicated by arrow 6 so that multiaxial stress states inside the individual material particles can be avoided or, at least, very greatly restricted. For this reason, the high damping effect of the shape-memory alloy for uniaxial stress states is maintained even if in solid damping bodies having a large dimension transverse to the loading direction 6 in which case, when looking at the damping body macroscopically, the expansion transverse to the loading direction 6 is otherwise impaired due to the large transverse dimension.

In addition, an additional measure for maintaining the damping property of shape-memory alloys despite high loading is provided in the embodiment of FIG. 1. Specifically, a plurality of elastic relieving bodies, namely relieving pins 5, which are sized and configured for a static portion of the load, are arranged along the lines of force of the loading of the damping body 4 and parallel to the latter. The relieving pins 5 are integrated in the damping body 4 and can be made of a conventional metallic material, e.g. structural steel. These pins 5 act like a stiff compression spring and keep a static portion of the load away from the damping body 4 so that the damping body 4 is essentially loaded only by the alternating portion of the load. In the martensitic region, the damping level is essentially dependent only upon the amplitude of the alternating stress, although creep occurs at high average stresses. This creep can be avoided by the relieving pins. As illustrated in FIGS. 1 and 2, both measures, namely porous configuration of the damping body 4 and integration of relieving pins 5, can be used at the same time. The relieving pins 5, or functionally identical elastic relieving bodies of different configuration, can likewise be made of a shape-memory alloy, although in that case care has to be taken through suitable selection of alloy type that they are in the austenitic structural state and thus have a high strength and high elasticity within the entire operating-temperature range.

Figure 3:
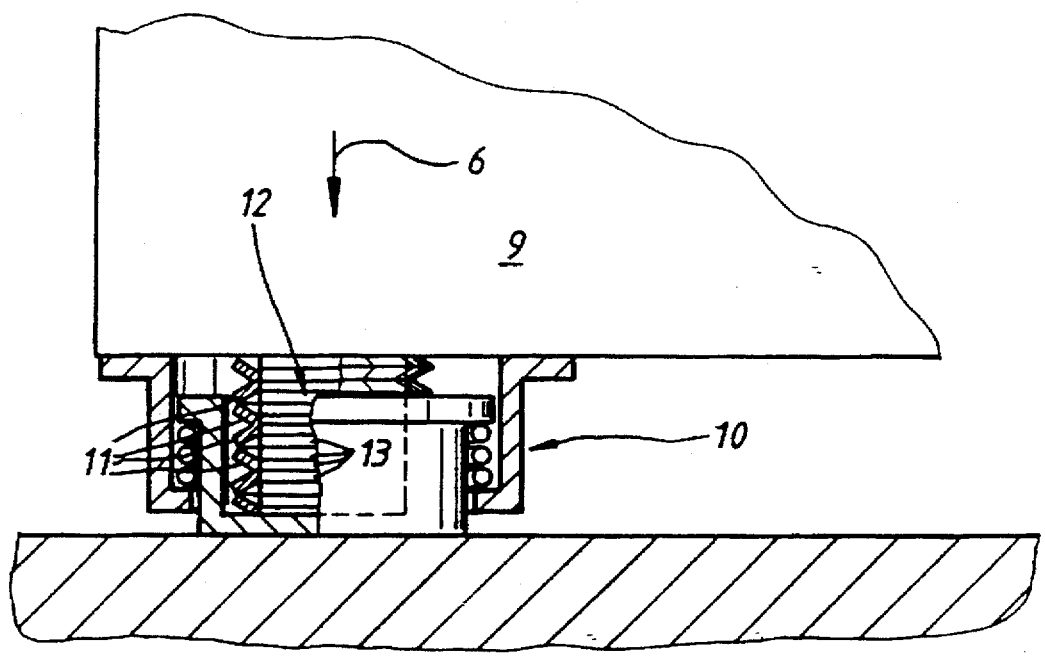
FIG. 3 is a cross-sectional view of a damping body laminated from sheet-metal layers of shape-memory alloy in an embodiment of a damping foot for an apparatus such as a heavy machine.
Figure 4:
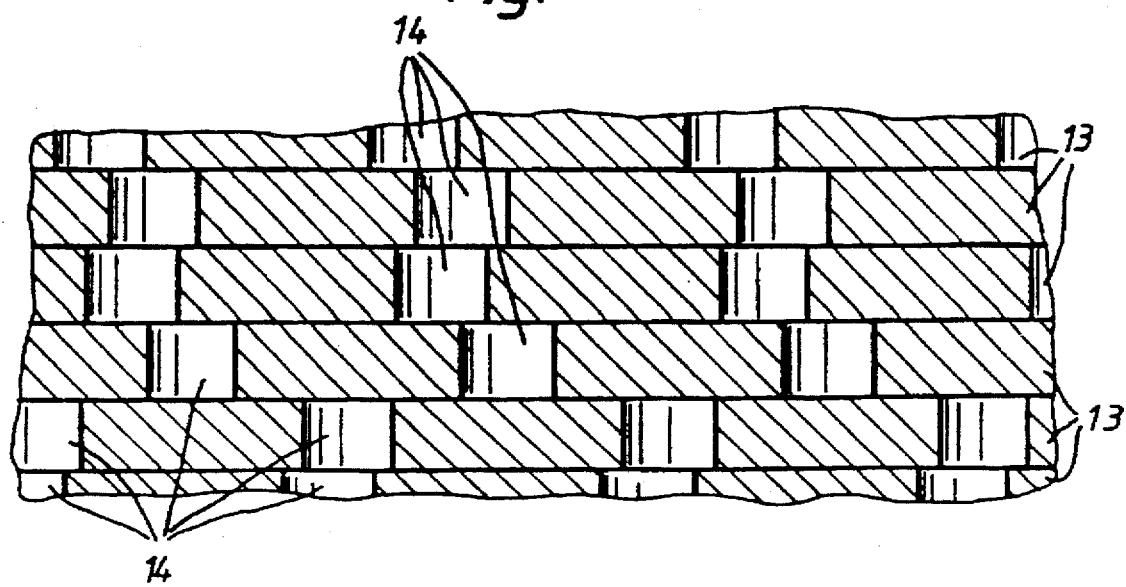
FIG. 4 is a greatly enlarged cross-sectional detail of the laminated arrangement of the damping body of FIG. 3.

The embodiment of FIG. 3 shows a damping foot 10 for supporting a heavy machine 9. The damping foot 10 has a cylindrical damping body 12 accommodated in a protected manner in a telescopic housing. The static basic-load portion of the machine weight is absorbed by a row of disc springs 11 which surround the cylindrical damping body 12. The damping body 12 is consequently only loaded by the alternating portion of the load which acts on the damping body 12 in the direction 6. Both measures for avoiding high multiaxial stress states in the damping body 12 are also applied in the embodiment of FIG. 3. In addition to the elastic relieving bodies in the form of disc springs 11, many small hollow spaces are uniformly distributed in the interior of the damping body 12. These hollow spaces are formed in the damping body 12 by forming it, as seen in FIG. 4, of a multiplicity of thin perforated sheet-metal layers 13 which have holes 14. The layers 13 are made of shape-memory alloys and are connected, e.g. soldered together or adhesively bonded, to form a combination having hollow spaces. The sheet-metal layers extend transversely to the loading direction 6 of the damping body 12, but it is also within the scope of the present invention to arrange the lamellae parallel to the loading direction 6.

Figure 5:
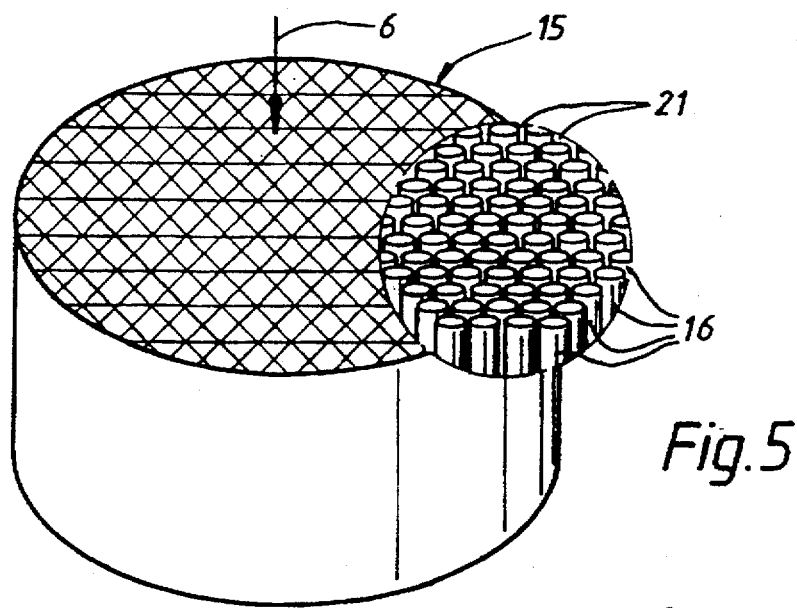
FIGS. 5 to 7 are perspective views of further embodiments of the present invention in the form of damping bodies having hollow spaces and different configurations of the hollow spaces.

In the embodiment of FIG. 5 which shows cylindrical damping body 15, the hollow spaces are formed of a multiplicity of thin, round metal rods 16 (see the enlarged isolated portion) of shape-memory alloy being connected to form a combination having hollow spaces. These rods can be sintered together or joined by soldering or adhesive bonding. As a result, gussets or spaces 21, each orientated parallel to the loading direction 6, are formed between the round metal rods 16 which are conveniently joined together to form a hexagonal pattern. When subjected to high loading, the metal rods 16 can expand transversely into the gussets 21. Instead of being sintered to one another, the metal rods 16 can, as previously noted, also be soft soldered or adhesively bonded to one another, although care has to be taken that the gussets 21 do not fill up with soft solder or adhesive compound. If need be, a foam resin can also be used as adhesive, which, on account of its foam structure, despite filling up the gussets, does not hinder transverse expansion of the rod material into the gussets. It is also within the scope of the present invention to hold together the metal rods 16 to form a cylindrical body only by an external binding. The metal rods 16 can be formed by cutting to length from a wire of shape-memory alloy. After they are joined together into a hexagonal pattern and are pressed together by a binding, the end faces of the so-formed cylindrical body can be face-ground.

Figure 6:
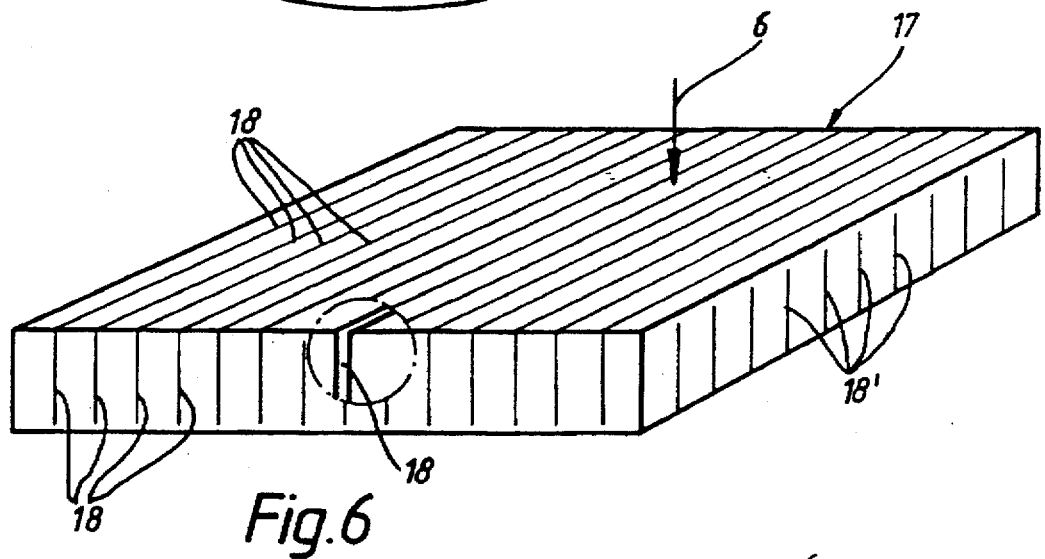

The damping body 17 shown in FIG. 6 can be made from a solid rectangular plate of shape-memory alloy. As shown in the enlarged, isolated portion designated by the dot-dash circle, narrow slots 18 are made in the plate from above at a small distance apart. These slots 18 extend parallel to the loading direction 6 and extend in the depth direction virtually down to the opposite flat side of the plate. In their longitudinal direction, the slots 18 extend transversely across the entire extent of the plate. In the same way, slots 18' can likewise be made from the flat side shown at the bottom in FIG. 6. These slots 18' run transversely to the top slots 18 and likewise extend in the depth direction parallel to the loading direction 6. On account of this crosswise pattern of slots 18, 18', the previously solid plate is turned into a regular pattern of vertically orientated square columns which are held together by narrow residual webs to form a combination. The narrow slots create a hollow transverse-expansion space into which the individual columns can expand in the case of loading direction 6. As stated, multi-axial stress states within the individual supporting material particles can thereby be avoided or, at least, greatly reduced.

Figure 7:
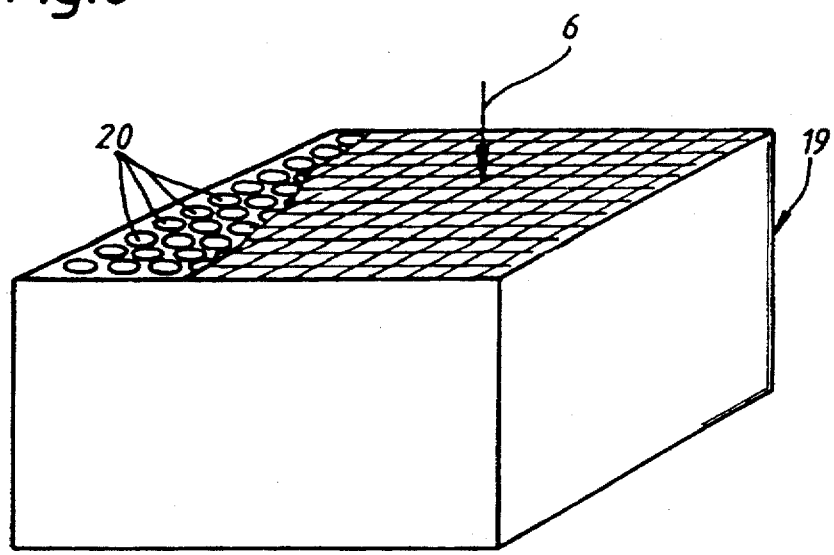

In the parallelepiped-shaped damping body 19 shown in FIG. 7, the hollow spaces inside the damping body 19 are formed by a pattern of closely adjacent, narrow bores 20 which are orientated parallel to the loading direction 6. The vertical material cross-sections left behind between the adjacent bores 20 act, as it were, as supporting columns which can expand transversely into the bores 20 during compressive loading. The hollow-space portion can be increased by bores (not shown) which run horizontally, i.e., transversely to the loading direction 6, being provided in the damping body 19 in addition to vertically orientated bores 20. An appropriate pattern, diameter and spacing of the bores 20 is effected, so that the remaining supporting cross-sections are cut by the horizontal bores. In this way, from a solid block, a relatively high volumetric portion in the form of many uniformly distributed hollow spaces can be accommodated inside the damping body. The bores can be produced in conventional manner by machining by way of a rotating drill or by a high-energy beam, e.g. a laser beam. Laser bores or laser slots can be made in a material-saving manner and in confined ambient conditions or on small damping bodies.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A shape-memory alloy metallic damping body for damping periodically alternating loads, comprising a multiplicity of closely adjacent, small and uniformly distributed hollow spaces, which together make up at least about 5% of the total volume of the damping body, arranged in an interior of the damping body.

2. The metallic damping body according to claim 1, wherein the proportion of open volumetric portion to total volume of the damping body is about 15 to 40%.

3. The metallic damping body according to claim 1, wherein the hollow spaces in the damping body are defined by pores between sintered metal grains of shape-memory alloys.

4. The metallic damping body according to claim 1, wherein a multiplicity of joined thin, perforated sheet-metal layers of shape-memory alloys constitute the damping body with the hollow spaces defined therebetween and are orientated one of transversely and parallel to a loading direction of the damping body.

5. The metallic damping body according to claim 1, wherein a multiplicity of joined thin, round metal rods of shape-memory alloys constitute the damping body with the hollow spaces defined therebetween and are orientated parallel to a loading direction of the damping body.

6. The metallic damping body according to claim 1, wherein the hollow spaces in the damping body are defined by a pattern of closely adjacent, narrow slots having a depth direction which extends approximately parallel to a loading direction.

7. The metallic damping body according to claim 1, wherein the hollow spaces in the damping body are formed by a pattern of closely adjacent, narrow bores orientated parallel to a loading direction of the damping body.

8. The metallic damping body according to claim 1, wherein an elastic relieving body for a static load portion of the alternating loads is arranged parallel to a loading direction of the damping body, which elastic relieving body separate the static load portion from the damping body such that the damping body is loaded essentially only by the alternating portion of the load.

* * * * *